No. 613,336. Patented Nov. 1, 1898.
F. TOEPFER.
TRUCK.
(Application filed June 3, 1898.)
(No Model.) 2 Sheets—Sheet 1.

Witnesses. Inventor.
Frank Toepfer
By Benedict & Morsell
Attorneys.

No. 613,336. Patented Nov. 1, 1898.
F. TOEPFER.
TRUCK.
(Application filed June 3, 1898.)
(No Model.) 2 Sheets—Sheet 2.
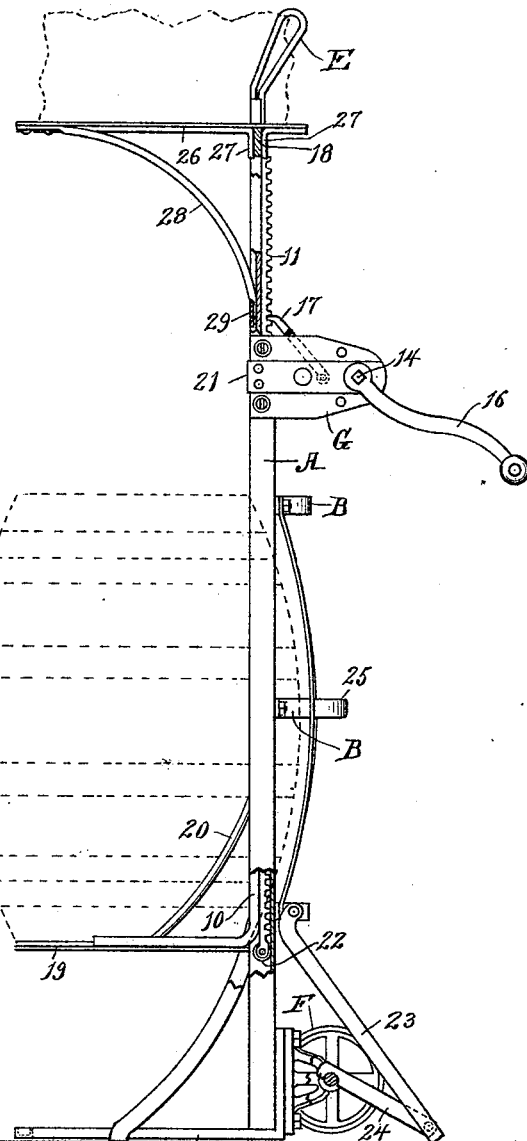
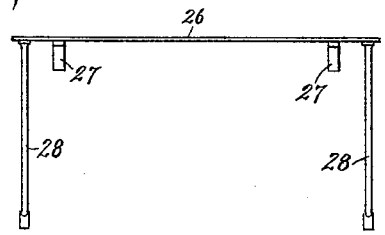
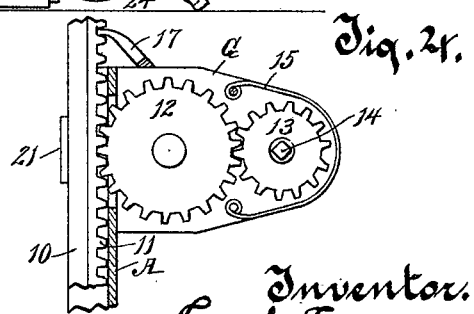
Witnesses.
C. H. Keeney.
Anna V. Faust.
Inventor.
Frank Toepfer
By Benedict & Morsell
Attorneys.

UNITED STATES PATENT OFFICE.

FRANK TOEPFER, OF MILWAUKEE, WISCONSIN.

TRUCK.

SPECIFICATION forming part of Letters Patent No. 613,336, dated November 1, 1898.

Application filed June 3, 1898. Serial No. 682,444. (No model.)

*To all whom it may concern:*

Be it known that I, FRANK TOEPFER, of Milwaukee, in the county of Milwaukee and State of Wisconsin, have invented a new and useful Improvement in Trucks, of which the following is a description, reference being had to the accompanying drawings, which are a part of this specification.

My invention relates to improvements in trucks of the class that are employed in warehouses, depots, stores, and manufacturing establishments for taking up and transporting boxes or packages of more or less bulk and of considerable weight for short distances in or around the warehouse, depot, store, or manufacturing plant; and my invention includes the providing such improvements in the form and construction of trucks as heretofore in use as will adapt them not only for the taking up and transporting of articles, but also for elevating or lowering such articles to a limited extent either before or after transporting them or independently of such transportation.

My improved truck is especially well adapted for handling kegs or packages of beer and blocks of ice in connection with the delivery of those articles by a truck or dray at a warehouse or saloon where beer coolers or refrigerators are used, into which the package of beer is required to be placed through a door two or three feet or more above the floor and into which the ice is to be put through a door five or six feet or more above the floor. Its use in other places and for other purposes will be readily suggested to any one having occasion therefor.

My invention consists of the truck, its parts, and combinations of parts, as herein described and claimed, or their equivalents.

Figure 1:
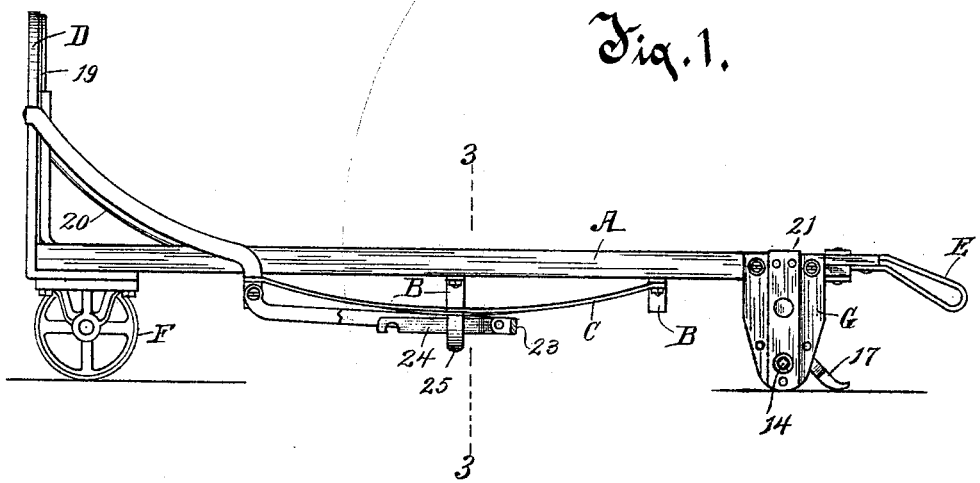
Figure 2:
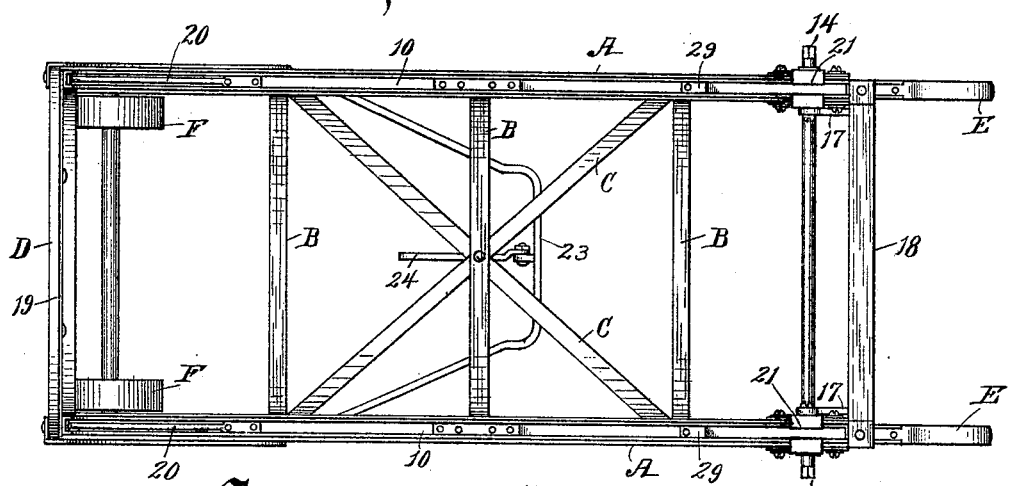
Figure 3:
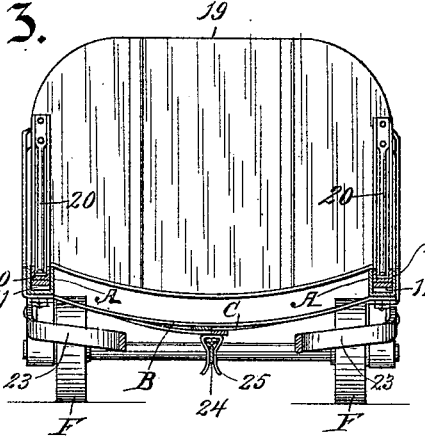

In the drawings, Figure 1 is a side elevation of my improved truck as it appears standing on a floor. Fig. 2 is a top plan elevation of the same truck in the position shown in Fig. 1. Fig. 3 is a transverse section of the truck on line 3 3 of Fig. 1, looking toward the left. Fig. 4 is a detail of elevating mechanism. Fig. 5 is a detail of a detachable shelf or platform. Fig. 6 is a side elevation of my improved truck, parts being broken away for convenience of illustration, the truck being shown in the position in which it is put for elevating articles, such as a keg or package of beer, from the ground or an article, such as a cake of ice, from a point above the ground to a still higher position.

In the drawings the frame of the truck consists, in a general way, of side rails A A, preferably constructed of parallel channeled-steel bars secured together by rigid tie-straps B B, braces C C, and a bowed member D at the rear or bottom end of the frame. Small truckwheels F F, fixed on an axle which is journaled in boxes therefor secured to the under side of the rails near their rear ends, are adapted to support the truck and its load when being moved from place to place. Legs G G, secured to the rails A A near the front ends thereof, serve to support that end of the rails in a substantially horizontal plane when the truck is in the position shown in Figs. 1 and 2, and these legs G G in my improved truck are so constructed as also to support parts of the elevating mechanism herein elsewhere described.

My improved truck is also provided with elongated rails 10 10, substantially as long as the rails A A, and that are fitted and slide endwise in the channels in the rails A A. These rails 10 10 are also preferably formed of channeled-steel bars of such smaller size as to fit movably in the channels of the rails A and have toothed racks 11 11 secured thereto and made a part thereof, extending substantially from one end of the rails to the other end thereof. These racks on the rails 10 10 are turned toward the bottom of the channels in the rails A A and they are engaged by toothed wheels 12 12, mounted, respectively, in the legs G, and these toothed wheels 12 mesh with pinions 13 13, fixed on a shaft 14, also journaled in the legs G. These legs G are preferably each made of steel plates fixed to the respective sides of the rail A, and the wheel 12 and pinion 13 are, in each leg, interposed between the side plates thereof. The pinion 13 is partially inclosed and protected by a guard 15, consisting of a metal strap interposed between the plates of the leg and secured thereto at the ends of the guard by pins or pivots fixed in the two plates of the leg and extending from one plate to the other. The shaft 14 is provided with a detachable crank-handle 16, and pawls 17 17, pivoted to the legs G, engage releasably the racks 11 and prevent the movement of the rails 10 in one direction or downwardly when the truck is in upright position. The rails 10 10 are secured to each other at the proper distance apart near their front or handle ends by the tie-strap 18, and at their rear or bottom ends the rails 10 are turned laterally substantially at a right angle to the length of the rails and a platform or footboard 19 is affixed thereto. Braces 20 20, secured to the rails 10 10 and to the footboard 19, strengthen the construction. Overturned ends of portions of the legs G form guards 21 21 over the channel in the side rails A A and retain the rack-rails 10 movably therein at that end of the frame. Little bearing-wheels 22 22, axled in the lower extremities of the rails 10, bear against the bottom of the rails A and permit of a free movement thereon. The rack-rails 10, including as a part thereof the racks 11, with the footboard 19 and the tie-strap 18, form an auxiliary frame which is practically a part of and extensible on the principal frame of the truck.

The truck is provided with handles E E, which are attached to the auxiliary frame and consist, conveniently, of half-round bar-steel folded together in loops, the ends of which are riveted to the ends of the rails 10. A swinging furcate leg 23 is hinged at its furcate extremities to the rails A A and is of such size and form as to bear at its free extremity on the floor, and thereby secure the truck in position when it is upright in the position shown in Fig. 6, the bowed member D on the opposite side of the rails A forming a foot that also rests on the floor and prevents the truck from tilting over in that direction. A swinging hook 24, pivoted to the leg 23, is adapted to catch onto the axle of the wheels F F and secure the free extremity of the leg 23 against escape from its work when in the position shown in Fig. 6. When it is desired to bring the frame of the truck down into a horizontal or nearly horizontal position, the leg 23 is released from the axle of the wheels F and is swung in the other direction, and the hook 24 is engaged by the spring-clasping catch 24, secured to the frame-braces C C, and is thereby held in place.

The use of a hand-truck of the general character of this one is well known, in and by which the footboard 19 (which in ordinary trucks is usually a mere toe-piece) is inserted under the article to be transported and the truck is then by the user, who takes hold of the handles, pushed about or drawn along, transporting the article to such place as is desired.

The method of using my improved truck, so far as its use involves the novel features of the truck, is illustrated in Fig. 6, in which a half-barrel beer-package is indicated in dotted lines as standing on its end on the platform 19, which has been elevated a little distance from the floor by rotating the crank 16, the frame of the truck being in upright position. It will be understood that a package can in this manner be readily raised two or three or even more feet from the ground readily by one man, thus enabling one person to elevate a half-barrel of beer to a sufficient height to shove it into a cooler or even to load it onto a wagon-truck.

In addition to the foregoing uses to which this truck may be put, I provide a detachable shelf or auxiliary platform 26, which is provided with short legs 27 27 in pairs, adapted to fit detachably on the opposite sides of the tie-strap 18, and also with braces 28, secured at one extremity to the outer edge of the platform 26 and at the other extremity adapted to enter releasably sockets therefor in the channels of the rails 10, conveniently made by securing a little strap or bar 29 from edge to edge of the bar over its channel. When the truck is in upright position, as shown in Fig. 6, this auxiliary platform 26 may be utilized for elevating an article to some distance above the reach of the attendant, and this feature of the device is convenient for elevating a block of ice (indicated in dotted lines in Fig. 6) from a position to which it can be readily lifted by the user of the truck to a height considerably above his head by elevating the auxiliary frame of the truck by means of the crank 16, and from which platform 26 the ice may be pushed by the user of the truck by a stick or pike or similar implement.

What I claim as my invention is—

1. In a hand-truck, the combination with a main frame of considerable length provided at its rear end with a fixed laterally-projecting foot member and supporting-wheels and near its front end with laterally-projecting legs but without handles for manipulating the truck, of an auxiliary frame substantially as long as the main frame and mounted slidable endwise on the main frame, a footboard on the auxiliary frame at the rear extremity thereof, handles on the auxiliary frame at the front extremity thereof, a laterally-projecting platform secured detachably to the auxiliary frame at a distance from the footboard, toothed racks on the auxiliary frame longitudinally thereof, toothed wheels mounted in the legs on the main frame and meshing with the racks on the auxiliary frame, means for rotating the toothed wheels, a pawl on the main frame releasably engaging one of said racks on the auxiliary frame, and a swinging leg hinged on the main frame adapted to bear on the floor on the opposite side to said footboard when the truck is in upright position.

2. In a hand-truck, the combination of a main frame the side rails of which are formed of channeled-metal bars, an auxiliary frame having side rails also formed of channeled-metal bars of smaller size in cross-section fitted and movable in the channels of the larger channeled bars of the main frame, the free edges of the rails of the auxiliary frame being substantially parallel and flush with the free edges of the rails of the main frame, a rack on the rear of the rail of the auxiliary frame and means on the main frame for moving the auxiliary frame endwise.

3. In a truck, the combination of a main frame, an auxiliary frame movable endwise on the main frame, means for extending and retrieving the auxiliary frame, means for supporting the main frame in an upright position endwise, and a platform supported removably on the auxiliary frame at or near its front or upper extremity.

4. In a hand-truck, the combination of a main frame having channeled side rails, an auxiliary frame, the side rails of which fit and are slidable endwise in the channeled rails of the main frame, bearing-wheels on the rails of the auxiliary frame traveling on the bottom of the channel of the rails of the main frame, and guards on the main frame extending over the channels of the rails securing the rails of the auxiliary frame movably in the channels of the rails of the main frame.

In testimony whereof I affix my signature in presence of two witnesses.

FRANK TOEPFER.

Witnesses:
C. T. BENEDICT,
ANNA V. FAUST.